United States Patent
Suyama

(10) Patent No.: US 6,746,127 B2
(45) Date of Patent: Jun. 8, 2004

(54) REARVIEW MIRROR

(75) Inventor: Terumasa Suyama, Aichi (JP)

(73) Assignee: Kabushiki Kaisha Tokai Rika Denki Seisakusho, Aichi (JP)

(*) Notice: Subject to any disclaimer, the term of this patent is extended or adjusted under 35 U.S.C. 154(b) by 98 days.

(21) Appl. No.: 10/191,914

(22) Filed: Jul. 9, 2002

(65) Prior Publication Data

US 2003/0011905 A1 Jan. 16, 2003

(30) Foreign Application Priority Data

Jul. 13, 2001 (JP) ........................................ 2001-213595

(51) Int. Cl.[7] .................................................. G02B 5/08
(52) U.S. Cl. ........................................................ 359/838
(58) Field of Search ............................... 359/871, 872, 359/838; 430/461, 905

(56) References Cited

U.S. PATENT DOCUMENTS 6,158,655 A   12/2000   DeVries, Jr. et al.

2003/0107521 A1 * 6/2003 Matsuura et al. ........... 343/713

FOREIGN PATENT DOCUMENTS

FR   2 783 777 A1   3/2000
JP   11-28980   2/1999

* cited by examiner

*Primary Examiner*—Euncha Cherry
(74) *Attorney, Agent, or Firm*—Crompton, Seager & Tufte, LLC

(57) ABSTRACT

A rearview mirror is located between a driver's seat and a front passenger's seat. The rearview mirror includes a housing, a reflector, and an interface. The housing includes a front surface facing the driver's seat, a rear surface at the opposite side of the front surface, and a slot at a part closer to the driver's seat than the passenger's seat. A recording medium is attached to and removed from the interface by moving the recording medium along a predetermined moving axis. The interface performs at least one of reading of data from the medium and writing of data to the medium. The predetermined moving axis is inclined relative to the width direction of the housing such that the predetermined moving axis approaches the center in the width direction of the housing from the front surface toward the rear surface.

18 Claims, 7 Drawing Sheets

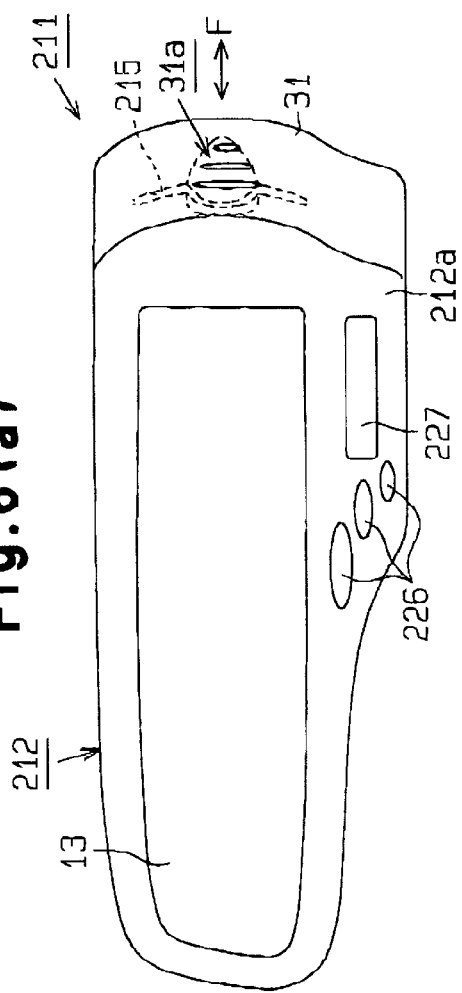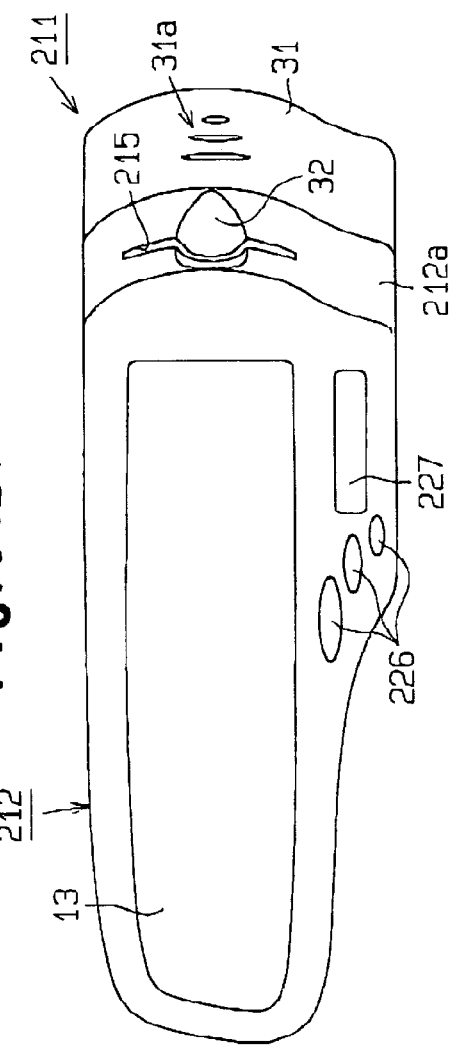

REARVIEW MIRROR

BACKGROUND OF THE INVENTION

The present invention relates to a rearview mirror provided in the passenger compartment of a vehicle.

In recent years, with the development of intelligent transport systems (ITS), incorporation of an information network into vehicles is now under progress. Together with this trend, vehicles are equipped with a human machine interface (HMI) associated with a variety of information systems. The HMI is located at a location at which a driver can easily operate it, such as near the driver's seat. For example, in an electronic toll collection system (ETC), a car-equipped ETC is provided near the driver's seat as an HMI.

Generally, a variety of operation devices, a display, and the like are provided near the driver's seat, so that it is sometimes difficult to ensure a space for installing a car-equipped ETC. To address this problem, conventionally, there has been proposed to arrange the car-equipped ETC within a rearview mirror which is provided with multiple functions. In the following, a conventional rearview mirror 51 will be described with reference to FIGS. 9 to 11.

As shown in FIG. 9, the rearview mirror 51 is located between a driver's seat 54 and a passenger's seat 55 in a front section of a passenger compartment 53 of a vehicle 52. As shown in FIGS. 10 and 11, the rearview mirror 51 includes a housing 56 and a reflector 57. The reflector 57 is fixed in the passenger compartment 53 to orient substantially toward the back of the vehicle. A slot 58, through which an IC card 159 can be inserted as a recording medium, is formed on a side facing the driver's seat of the housing 56 (on the right side in FIGS. 10 and 11).

As shown in FIG. 11, the housing 56 contains an interface unit 59 and a data processing unit 60 which make up a car-equipped ETC. The interface unit 59 is provided with a card holder 59a which is in communication with the slot 58. The card holder 59a is formed such that the IC card 159 can be inserted into or removed from the card holder 59a in a direction substantially parallel with the mirror surface of the reflector 57.

For ensuring a backward field of view from the driver's seat, the mirror surface of the rearview mirror 51 must be inclined toward the driver's seat. Specifically, as shown in FIG. 9, the rearview mirror 51 is used with its mirror surface inclined toward the driver's seat by up to 30 degrees. However, the rearview mirror 51 is set such that the IC card 159 is inserted in a direction substantially parallel with the mirror surface of the rearview mirror 51. For this reason, for inserting the IC card 159, the driver is obliged to insert the IC card 159 backward from a direction in which the vehicle 52 is running, as indicated by an arrow F1 in FIG. 9. In other words, the driver must insert the IC card 159 in front from a position far from the driver's scat. Therefore, a windshield is likely to interfere with the driver's hand or the like when the driver inserts or remove the IC card 159, making it difficult to perform operations involved in the insertion and removal of the IC card 159.

SUMMARY OF THE INVENTION

It is an object of the present invention to provide a rearview mirror which permits the driver to readily insert or remove a thin recording medium.

In order to attain the above object, the present invention provides a rearview mirror located between a driver's seat and a front passenger's seat in a front section of the passenger compartment of a vehicle. The rearview mirror includes a housing, a reflector and an interface. The housing includes a front surface facing the driver's seat, a rear surface at the opposite side of the front surface, and a slot at a part closer to the driver's seat than the passenger's seat. The slot receives a recording medium that stores predetermined data. The reflector is attached to the front surface of the housing. The interface is located in the housing. The recording medium is attached to and removed from the interface by moving the recording medium along a predetermined moving axis. The interface performs at least one of reading of data from the recording medium and writing of data to the recording medium. The predetermined moving axis is inclined relative to the front surface of the housing such that the predetermined moving axis approaches the center of the housing.

Other aspects and advantages of the invention will become apparent from the following description, taken in conjunction with be accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6(a) is a front view showing the rearview mirror in the other embodiment of the present invention when a slide cover is closed;

FIG. 6(b) is a front view showing the rearview mirror of FIG. 6(a) when the slide cover is opened;

DETAILED DESCRIPTION OF THE PREFERRED EMBODIMENTS

In the following, a first embodiment which embodies the present invention will be described in detail with reference to FIGS. 1 to 4.

Figure 1:
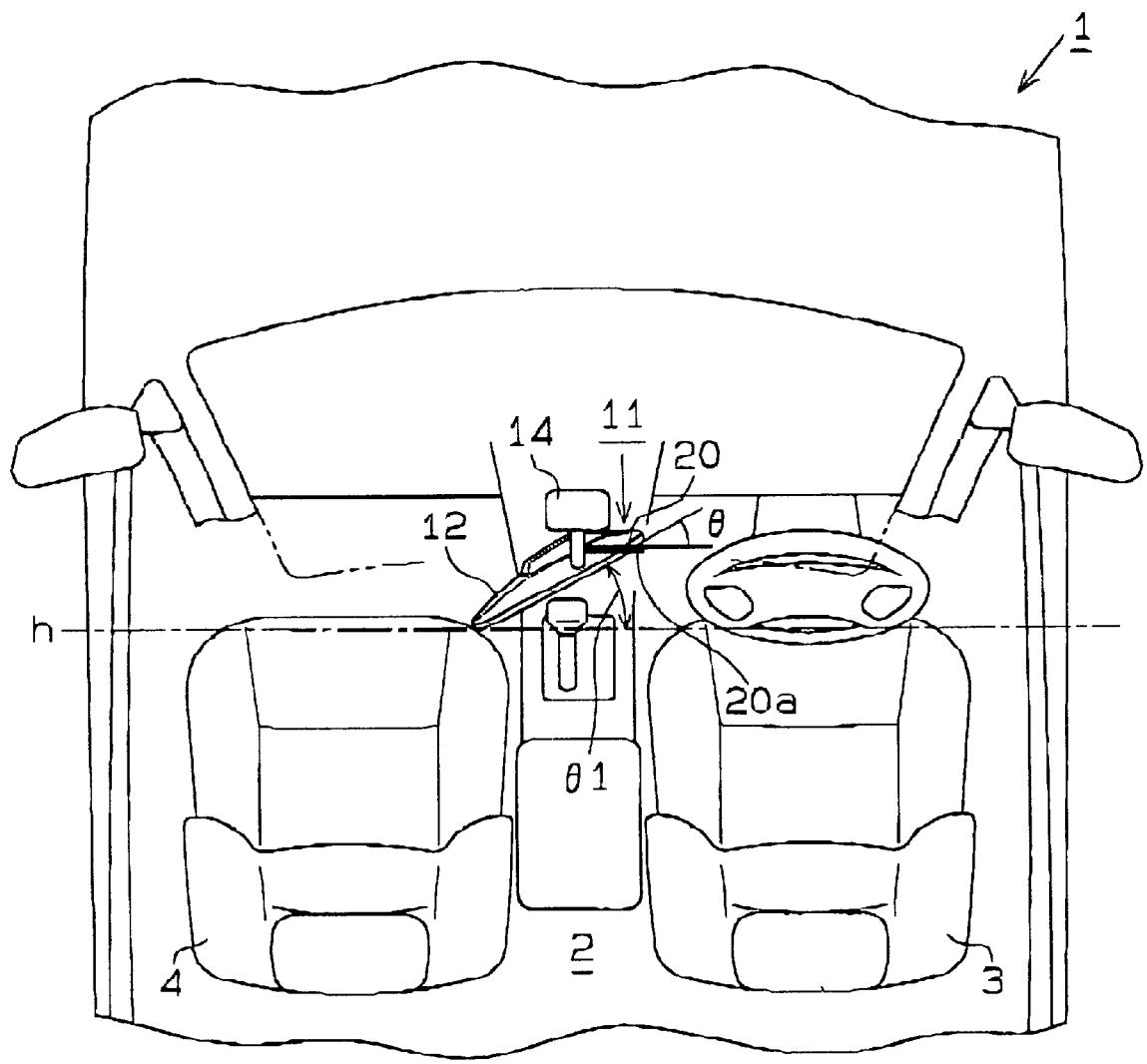
FIG. 1 is a top plan view showing a passenger compartment of a vehicle which is equipped with a rearview mirror in one embodiment which embodies the present invention.
Figure 2:
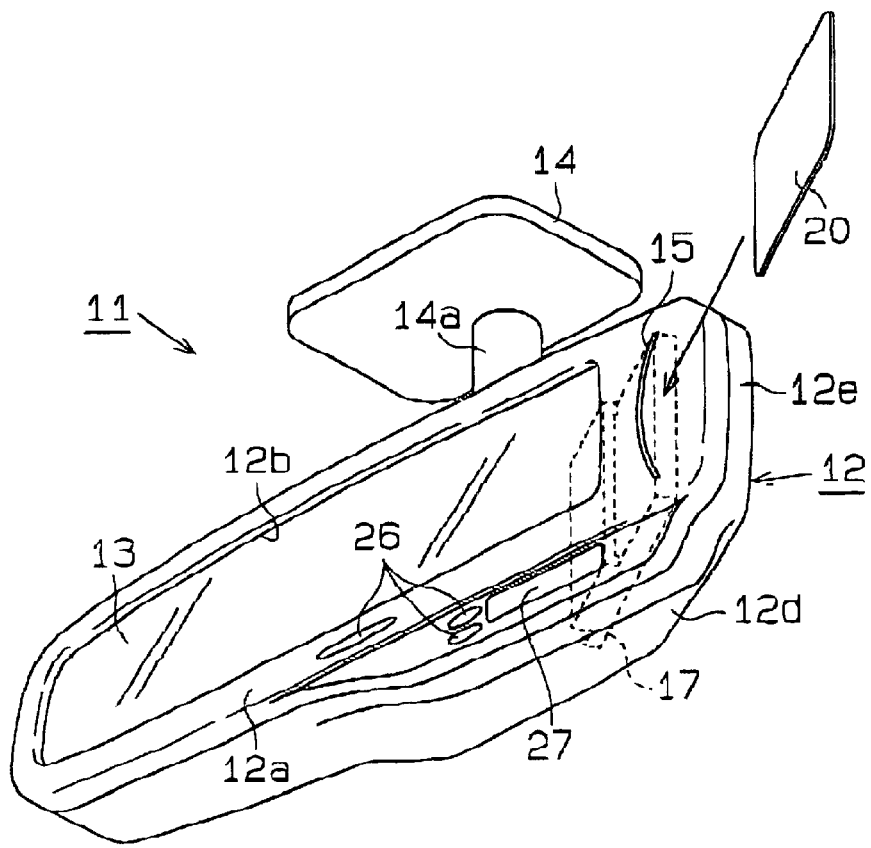
FIG. 2 is a perspective view showing the rearview mirror of FIG. 1.
Figure 3:
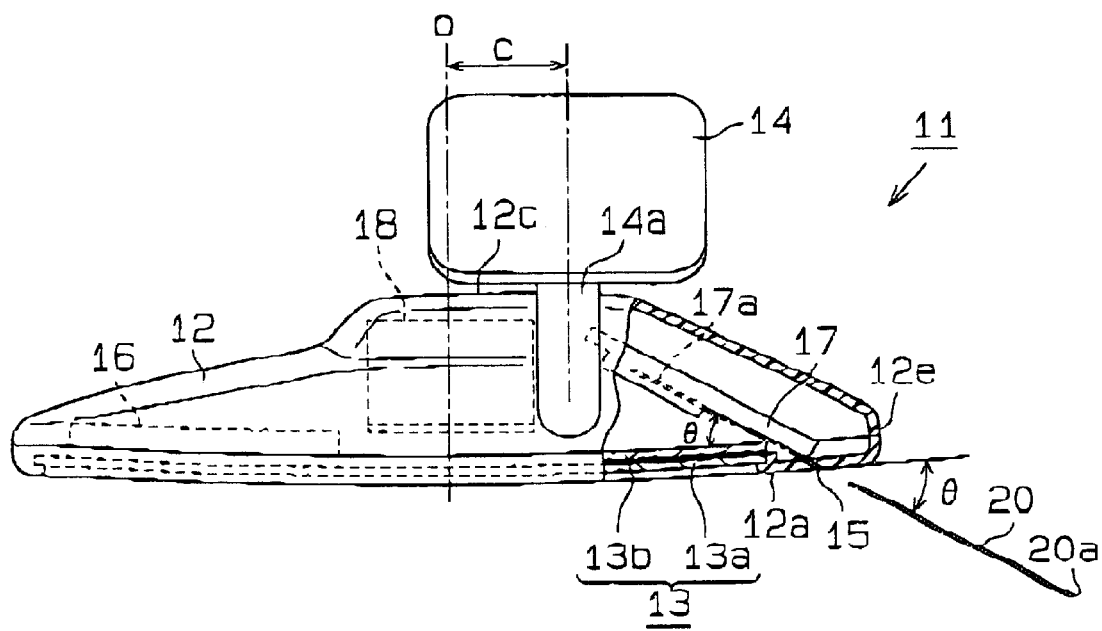
FIG. 3 is a partially cutaway plan view of the rearview mirror of FIG. 1.

As shown in FIG. 1, a rearview mirror 11 is located between a driver's seat 3 and a passenger's 4 in a front section of a passenger compartment 2 of a vehicle 1. As shown in FIGS. 2 and 3, the rearview mirror 11 includes a housing 12, a reflector 13, and a fixture 14. An opening 12b is formed on a front surface 12a of the housing 12, and the reflector 13 is fixed in the opening 12b. The fixture 14 is joined on the top surface of the housing 12. The fixture 14 includes a supporting shaft 14a which is in contact with the housing 12 through a spherical surface. Thus, the housing 12 is three dimensionally pivotally movable about the supporting shaft 14a in three axial directions.

As shown in FIG. 3, the supporting shaft 14a is joined to the housing 12 at a location deviated by a distance C to the right in FIG. 3 with respect to a center line C of the housing 12. In other words, the supporting shaft 14a is joined to the housing 12 at a location spaced by the distance C from the center line O of the housing 12. The distance C is set such that the supporting shaft 14a is joined to the housing 12 at a location which matches the center of gravity of the rearview mirror 11. As shown in FIG. 1, the rearview mirror 11 is fixed to the vehicle 1 such that the reflector 13 is oriented approximately to the rear of the vehicle.

As shown in FIGS. 2 and 3, a slot 15 is formed beside the reflector 13 (on the right side in FIGS. 2 and 3) on the front surface 12a of the housing 12. Thus, the driver, opposite to the reflector 13, can view the slot 15. In this embodiment, the slot 15 extends vertically in the shape of an arc which is curved toward the mirror surface 13.

As shown in FIG. 3, the housing 12 contains a reflectivity varying device 16, and an interface unit 17 and a data processing unit 18 which make up a car-equipped ETC.

The reflector 13, which has a double-structure, includes a first mirror 13a and a second mirror 13b. Electro-optical element, such as an electro-chromic element, and a liquid crystal element (neither shown) are interposed between the first mirror 13a and second mirror 13b. The reflectivity varying device 16 is located near the rear surface of the reflector 13 for controlling the electro-optical element to vary the reflectivity of the reflector 13 for preventing the glare.

The interface unit 17 is formed with a mount portion. In this embodiments the mount portion is a card holder 17a, into which an IC card 20 can be inserted as a recording medium. When the IC card 20 is inserted into the card holder 17a, the interface unit 17 reads data recorded on the IC card 20 or writes data into the IC card 20.

The interface unit 17 is located within the housing 12 such that the card holder 17a is in communication with the slot 15. As the IC card 20 in inserted into the slot 15, the IC card 20 is mounted in the interface unit 17. As shown in FIG. 1, when the IC card 20 is completely inserted into the interface unit 17, a proximal end portion 20a of the IC card 20 slightly protrudes from the housing 12. This protruding proximal end portion 20a serves as a portion to be caught by the driver when he removes the IC card 20.

As shown in FIG. 3, the interface unit 17 is located within the housing 12 such that the card holder 17a is at a predetermined angle $\theta$ to the mirror surface of the reflector 13. In other words, the interface unit 17 is located within the housing 12 such that the IC card 20 is inserted into the card holder 17a in a direction which is inclined by the predetermined angle $\theta$ to a direction parallel with the mirror surface of the reflector 13. More specifically, the interface unit 17 is inclined relative to the mirror surface of the reflector 13 such that the card holder 17a approaches the center the housing 12 from the front surface 12a toward the rear surface 12c. The predetermined angle $\theta$ is set to an angle equivalent to a maximum inclination angle (angle $\theta 1$ shown in FIG. 1) to direction h of the vehicle 1 shown in FIG. 1, when the driver inclines the mirror surface of the reflector 13 toward the driver for ensuring a backward field of view of the vehicle 1, or to an angle slightly larger than the inclination angle $\theta 1$. With such setting, the IC card 20 is inserted into the interface 17 in a direction identical to the direction h of the vehicle. The inventors have confirmed that the inclination angle $\theta 1$ of the mirror surface is about 29 degrees at maximum. In this embodiment, the predetermined angle $\theta$ is set to about 30 degrees.

Figure 4:
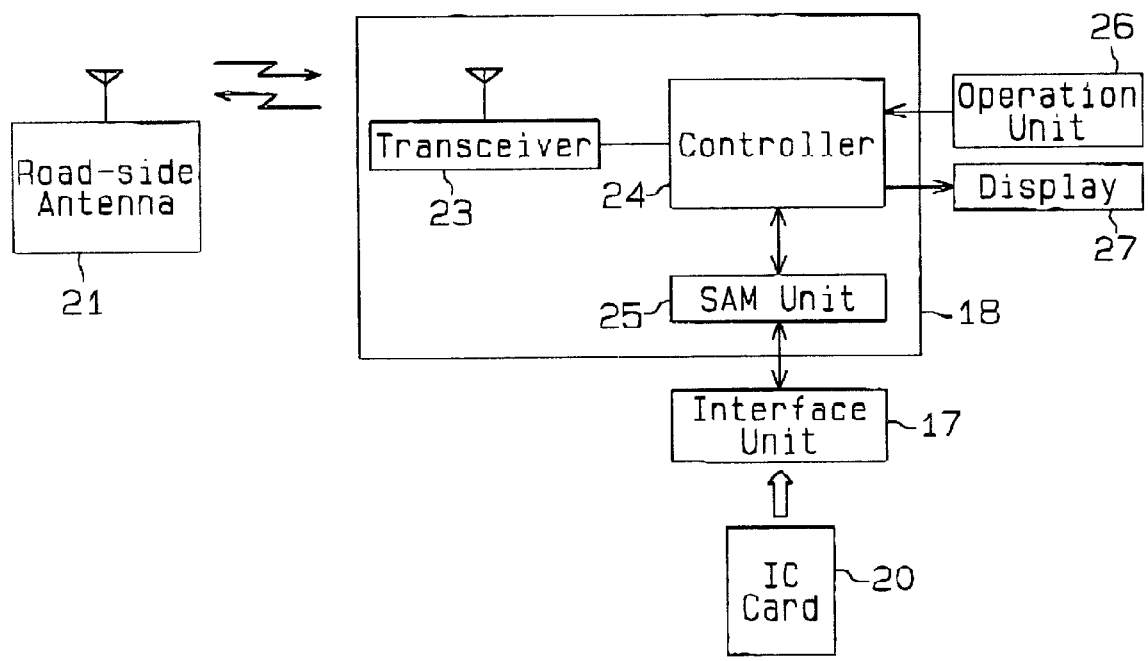
FIG. 4 is a block diagram schematically showing the internal configuration of a data processing unit built in the rearview mirror of FIG. 1.

The data processing unit 18 is located at a location in the housing 12 at which the data processing unit 18 does not interfere with the reflectivity varying device 16 and interface unit 17. As shown in FIG. 4, the data processing unit 18 mutually communicates with road-side antennas 21 installed at a toll gate of a toll road. More specifically, the road-side antennas 21 are installed near the entrance and exit of the toll gate, respectively. The data processing unit 18 includes an antenna 22, a transceiver 23, a controller 24, and an SAM unit 25.

When a vehicle equipped with a car-equipped ETC enters a toll road, a radio wave which carries encrypted predetermined data is output from the road-side antenna 21 installed near the entrance of a toll gate. As the transceiver 23 of the data processing unit 1a receives the radio wave through the antenna 22, the data processing unit 18 demodulates the radio wave to a pulse signal to generate a received signal which is output to the controller 24. The controller 24 instructs the SAM unit 25 to decrypt the received signal, and outputs the decrypted data to the interface unit 17. Subsequently, the interface unit 17 writes the decrypted data into the IC card 20. The predetermined data includes data related to the location and time at which the vehicle entered the toll road, and the type of vehicle (light car, ordinary car, truck, bus, and the like).

On the other hand, when the vehicle exits the toll road, a radio wave including a response request signal is output from a road-side antenna 21 installed near an exit. Upon receipt of this response request signal, the controller 24 reads data related to the location from which the vehicle entered the toll road, and the type of vehicle, written into the IC card 20, through the interface unit 17, and encrypts the data using the SAM unit 25. The controller 24 forces the transceiver 23 to modulate the encrypted data to a radio wave at a predetermined frequency, and outputs the radio wave from the antenna 22. In summary, the controller 24 reads data related to the location from which the vehicle entered the toll roads and the type of vehicle from the IC card 20, encrypts the data, and transmits the encrypted data to the road-side antenna 21. The road-side antenna 21 outputs data indicative of the fee calculated from the encrypted data, the used date and time, and the like to the data processing unit 18. The controller 24 writes the data into the IC card 20.

An operation unit 26 and a display 27 are electrically connected to the controller 24. As shown in FIG. 2, the operation unit 26 and display 27 are located below the reflector 13 on the front surface 12a of the housing 12. Therefore, the operation unit 26 and display 27 can be operated and viewed by a passenger. In this embodiment, the operation unit 26 is made up of three push button switches, while the display 27 is made up of an LCD. As a passenger operates the operation unit 26, the display 27 displays information on a toll gate, information on a fare to the destination, and the like, in response to the operation.

The foregoing embodiment provides the following advantages.

(1) The interface unit 17 is located within the housing 12 such that the IC card 20 is inserted into the card holder 17a in a direction inclined by the predetermined angle θ to a direction parallel with the mirror surface of the reflector 13. Therefore, even when the rearview mirror 11 is inclined such that the mirror surface is oriented to the driver's seat, the IC card 20 in not inserted from a position far from the driver's seat. Therefore, when the IC card 20 is inserted into the interface unit 17, the windshield is less likely to interfere with the IC card 20, the driver's hand, and the like, thereby permitting the driver to readily insert and remove the IC card 20 into and from the interface unit 17.

Particularly, in the foregoing embodiment, the predetermined angle θ is set to 30 degrees. It is therefore possible to securely prevent the direction in which the IC card 20 is inserted into the interface unit 17 from being inclined in a direction from the front to the rear of the vehicle.

(2) The slot 15 is formed on the front surface 12a of the housing 12. This permits the driver to view the slot 15 when he directly faces the reflector 13. Therefore, even when the rearview mirror 11 is inclined such that the mirror surface of the reflector 13 is oriented to the driver's seat, the driver can view the slot 15. This permits the driver to readily insert the IC card 20 into the slot 15 and readily view whether or not the IC card 20 is inserted.

(3) The slot 15 is formed beside the reflector 13 on the front surface 12a of the housing 12 close to the driver's seat. In other words, the slot 15 is provided near the driver's seat in a vehicle with a right-hand steering wheel. Thus, the IC card 20 is inserted into the slot 15 near the driver's seat. This permits the driver to readily insert and remove the IC card, and prevents another passenger (a passenger seated on the passenger's seat, or a passenger seated on a back seat) from inserting and removing the IC card 20.

(4) The supporting shaft 14a is joined to the housing 12 at a location spaced by the distance C from the center line O in the housing 12. Thus, the supporting shaft 14a supports the rearview mirror 11 at the center of gravity. It is therefore possible to prevent a biased stress from being applied to the joint of the supporting shaft 14a and the housing 12 to prevent a degraded strength of the joint.

It should be apparent to those skilled in the art that the present invention may be embodied in many other specific forms without departing from the spirit or scope of the invention. Particularly, it should be understood that the invention may be embodied in the following forms.

Figure 5:
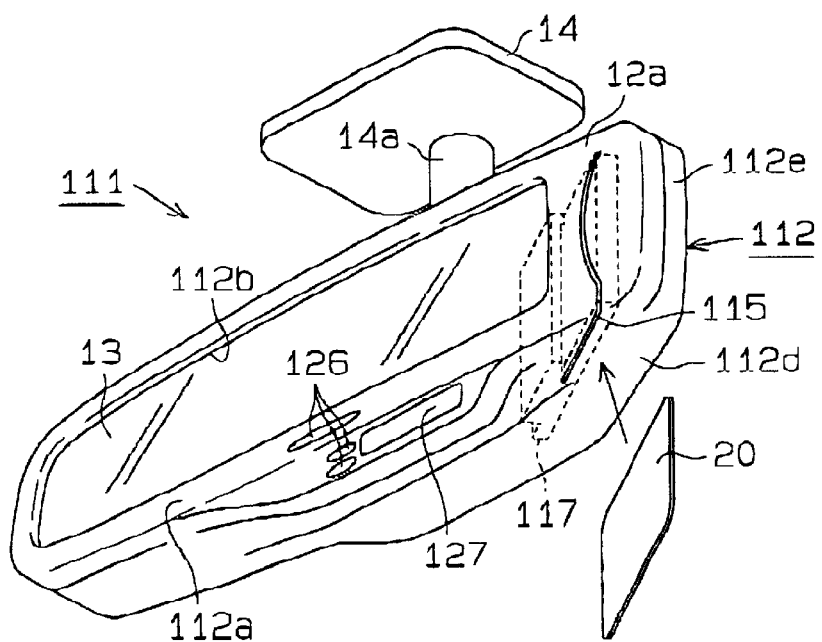
FIG. 5 is a perspective view showing a rearview mirror in another embodiment of the present invention.

As a rearview mirror 111 shown in FIG. 5, a slot 115 is formed over a front surface 112a and a lower surface 112d of a housing 112. In this way, the IC card 20 can be inserted into an interface unit 117 from the front surface 112a of the housing 112 as well as from the lower surface 112d of the housing 112. In other words, the IC card 20 can be inserted into the interface unit 117 from multiple directions. Thus, the driver can insert and remove the IC card according to his preference, thereby improving the efficiency in inserting and removing the IC card 20.

As a rearview mirror 211 shown in FIGS. 6(a) and 6(b), a slide cover 31 slidable in a direction F indicated by an arrow in the figures is formed at a location at which a slot 215 is formed on a front surface 212a of a housing 212. A finger resting protrusion 31a is formed on the surface of the slide cover 31. The slide cover 31 is slidable in a direction parallel with the reflector 13. As the slide cover 31 is slid, the slot 215 is selectively exposed and covered. The slot 215 has an arcuate section which is curved in a direction away from the reflector 13. A recess 32 is formed at a substantially central location of the slot 215 on the front surface 212a of the housing 212. When the IC card 20 is inserted into the interface unit 17, the proximal end portion 20a of the IC card 20 protrudes from the recess 32. This protruding proximal end portion 20a serves as a portion to be caught by the driver when he removes the IC card 20. According to the rearview mirror 211, the IC card 20 can be covered by the slide cover 31, thereby preventing unfailingly the IC card 20 from being stolen.

Figure 7:
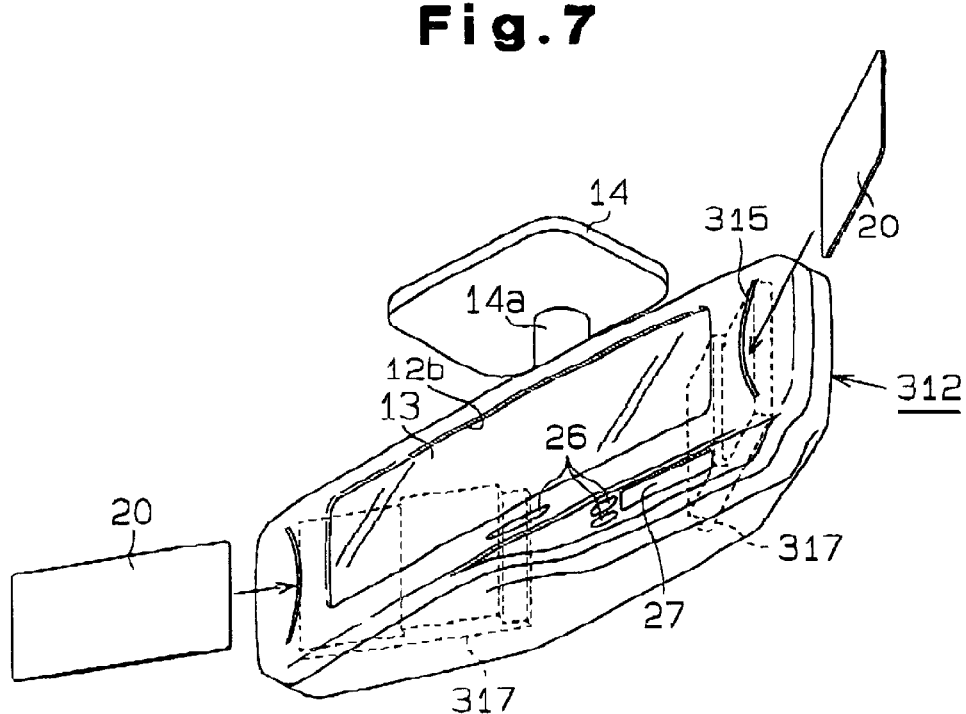
FIG. 7 is a perspective view showing a rearview mirror in a further embodiment of the present invention.
Figure 8:
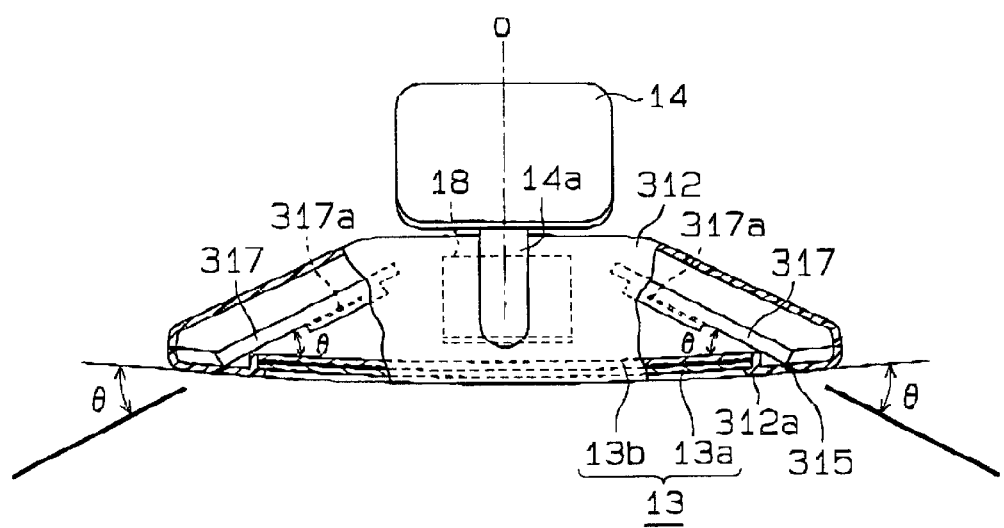
FIG. 8 is a partially cutaway plan view of the rearview mirror in the further embodiment of the present invention.
Figure 9:
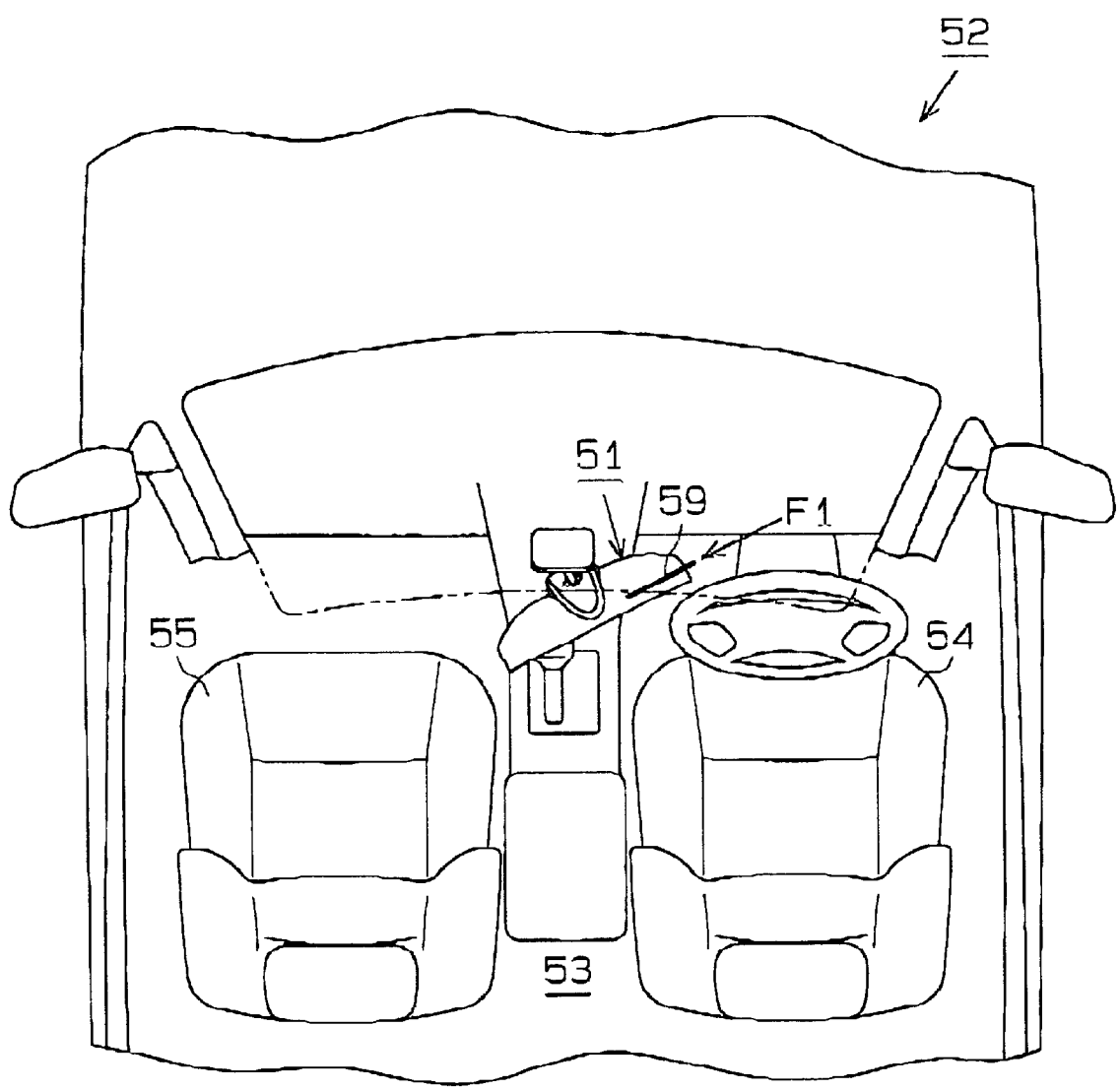
FIG. 9 is a plan view showing a passenger compartment of a vehicle equipped with a conventional rearview mirror.
Figure 10:
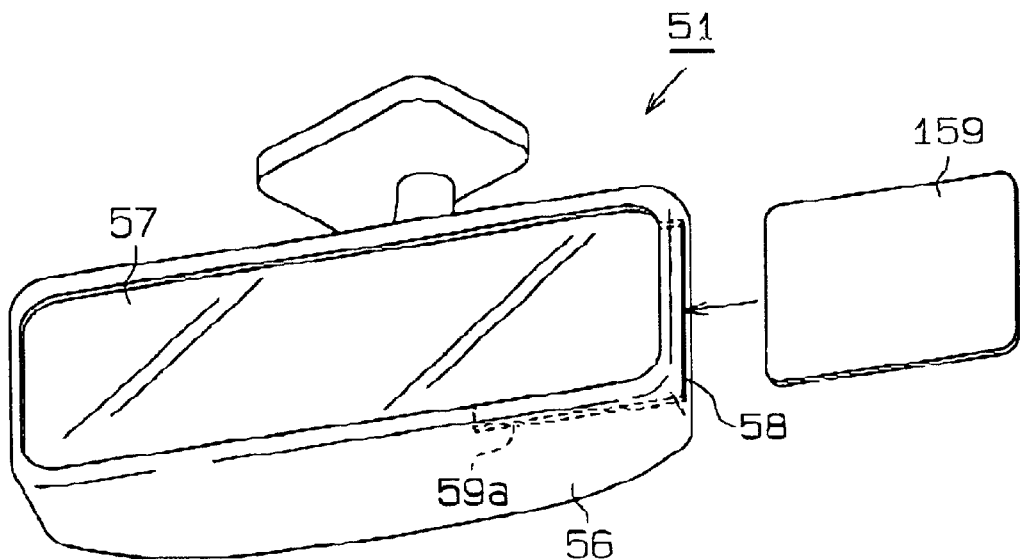
FIG. 10 is a perspective view showing the rearview mirror of FIG. 9.
Figure 11:
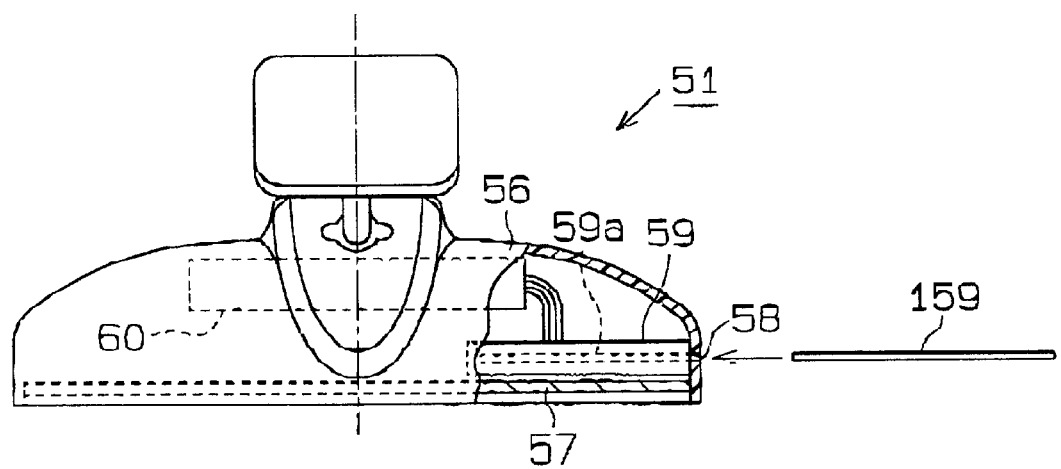
FIG. 11 is a partially cutaway plan view of the rearview mirror of FIG. 9.

As a rearview mirror 311 shown in FIGS. 7 and 8, a slot 315 and an interface unit 317 may be provided on both sides of the reflector 13. One slot is located at a part of the housing closer to the driver's seat than the front passenger's seat, and the other slot is located at a part of the housing closer to the front passenger's seat than the driver's seat. In this case, a housing 312 is substantially symmetric about the center line O so that the supporting shaft 14a is joined to the housing 312 on the center line O. The first slot and the second slot are substantially symmetric with respect to a plane passing thorough the center line O, and a first interface and a second interface are substantially symmetric with respect to the same plane. In this way, a passenger seated on the passenger's seat can also insert and remove the IC card 20 with ease. In addition, the rearview mirror 311 can be used both for a vehicle with a right-hand steering wheel and a vehicle with a left-hand steering wheel.

The slot 15 and interface unit 17 shown in FIG. 2 may be formed on the left side of the reflector 13. Wilt this arrangement made, the rearview mirror 11 can be applied to a vehicle with a left-hand steering wheel.

The slot 15 may be formed on a bottom surface 12d or a side surface 12e of the housing 12 shown in FIG. 2, not limited to the front surface 12a of the housing 12. However, it is more desirable to form the slot 15 at a location at which the driver can view the slot 15 when he directly faces the reflector 13.

The recording medium is not limited to the IC card 20, but any thin recording medium can be applied, such as card-type recording media, e.g. a magnetic card, discoidal recording media, e.g. a floppy disk, a CD-ROM, and a mini-disk, plate-type recording media, e.g. a memory stick, and the like.

The data processing unit 18 need not be contained in the housing 12, 112, 212, 312.

The operation unit 26, 126, 226 and display 27, 127, 227 need not be contained in the corresponding housing 12, 112, 212, 312.

The rearview mirror 11 need not be provided with a glare preventing function.

The rearview mirrors 11, 111, 211, 311 according to the present invention are not limited to be used for the receipt of a fare for a toll road, but may be applied, for example, to the receipt of a fee at a drive-through of a fast-food restaurant, and the receipt of a fee at a parking area and a gas station. In addition, the rearview mirrors 11, 111, 211, 311 according to the present invention are not limited to be used for the receipt of fee or fare, but may be used for opening and closing gates provided at the entrance and exit of a parking area of a company, a shutter of a garage, and the like.

Therefore, the present examples and embodiments are to be considered as illustrative and not restrictive and the invention is not to be limited to the details given herein, but may be modified within the scope and equivalence of the appended claims.

What is claimed is:

1. A rearview mirror located between a driver's seat and a front passenger's seat in a front section of the passenger compartment of a vehicle, the rearview mirror comprising:

a housing, wherein the housing includes a front surface facing the driver's seat, a rear surface at the opposite side of the front surface, and a slot at a part of the housing closer to the driver's seat than the passenger's seat, wherein the slot receives a recording medium that stores predetermined data;

a reflector attached to the front surface of the housing; and an interface located in the housing, wherein the recording medium is attached to and removed from the interface by moving the recording medium along a predetermined moving axis, wherein the interface performs at least one of reading of data from the recording medium and writing of data to the recording medium, and wherein the predetermined moving axis is inclined relative to the front surface of the housing such that the predetermined moving axis approaches toward the center of the housing.

2. The rearview mirror according to claim 1, wherein the slot is formed on at least one side of the housing facing the driver's seat such that a driver can see at least a part of the slot when facing the reflector.

3. The rearview mirror according to claim 1, wherein the slot is formed on more than one side of the housing.

4. The rearview mirror according to claim 3, wherein the slot is formed on the front surface and a lower surface of the housing.

5. The rearview mirror according to claim 1, wherein the slot is a first slot, and the rearview mirror further includes a second slot, wherein the second slot is located at a part of the housing closer to the front passenger's seat than the driver's seat.

6. The rearview mirror according to claim 5, wherein the interface is a first interface, and the rearview mirror further includes a second interface, which corresponds to the second slot.

7. The rearview mirror according to claim 6, wherein the first slot and the second slot are substantially symmetric with respect to a plane that passes through the center of the housing, and wherein the first interface and the second interface are substantially symmetric with respect to said plane.

8. The rearview mirror according to claim 1, further comprising a cover, wherein the cover selectively covers the slot.

9. The rearview mirror according to claim 1, wherein the predetermined moving axis is inclined by thirty degrees with respect to the front surface of the housing.

10. A rearview mirror located between a driver's seat and a front passenger's seat in a front section of the passenger compartment of a vehicle, the rearview mirror comprising:

a housing, wherein the housing includes a front surface facing the driver's seat, a rear surface at the opposite side of the front surface, and a slot at a part of the housing closer to the driver's seat than the passenger's seat, wherein the slot receives a recording medium that stores predetermined data;

a reflector attached to the front surface of the housing; and an interface located in the housing to correspond to the slot, wherein the interface includes a mount portion, to which the recording medium is detachably attached, wherein the mount portion is inclined relative to the surface of the reflector such that the mount portion approaches the center of the housing.

11. The rearview mirror according to claim 10, wherein the slot is formed on at least one side of the housing facing the driver's seat such that a driver can see at leant a part of the slot when facing the reflector.

12. The rearview mirror according to claim 10, wherein the slot is formed on more than one side of the housing.

13. The rearview mirror according to claim 12, wherein the slot is formed on the front surface and a lower surface of the housing.

14. The rearview mirror according to claim 10, wherein the slot is a first slot, and the rearview mirror further includes a second slot, wherein the second slot is located at a part of the housing closer to the front passenger's seat than the driver's seat.

15. The rearview mirror according to claim 14, wherein the interface is a first interface, and the rearview mirror further includes a second interface, which corresponds to the second slot.

16. The rearview mirror according to claim 15, wherein the first slot and the second slot are substantially symmetric with respect to a plane that passes through the center of the housing, and wherein the first interface and the second interface are substantially symmetric with respect to said plane.

17. The rearview mirror according to claim 10, further comprising a cover, wherein the cover selectively covers the slot.

18. The rearview mirror according to claim 10, wherein the mount portion is inclined by thirty degrees with respect to the surface of the reflector.

* * * * *

UNITED STATES PATENT AND TRADEMARK OFFICE
CERTIFICATE OF CORRECTION

PATENT NO. : 6,746,127 B2
DATED : June 8, 2004
INVENTOR(S) : Terumasa Suyama

It is certified that error appears in the above-identified patent and that said Letters Patent is hereby corrected as shown below:

Column 8,
Line 19, delete "leant", and insert therefor -- least --.

Signed and Sealed this

Seventeenth Day of August, 2004

JON W. DUDAS
*Acting Director of the United States Patent and Trademark Office*